United States Patent
Zhuang et al.

(10) Patent No.: US 12,021,456 B2
(45) Date of Patent: Jun. 25, 2024

(54) ISOLATED BIDIRECTIONAL CONVERTER AND METHOD FOR CONTROLLING THE SAME

(71) Applicant: Sungrow Power Supply Co., Ltd., Hefei (CN)

(72) Inventors: Jiacai Zhuang, Hefei (CN); Jun Xu, Hefei (CN); Hanyu Wang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 141 days.

(21) Appl. No.: 17/694,767

(22) Filed: Mar. 15, 2022

(65) Prior Publication Data

US 2022/0416672 A1    Dec. 29, 2022

(30) Foreign Application Priority Data

Jun. 25, 2021  (CN) .......................... 202110713267.5

(51) Int. Cl.
  *H02M 3/335*    (2006.01)
  *H02M 1/00*     (2006.01)
  *H02M 3/00*     (2006.01)

(52) U.S. Cl.
  CPC ..... *H02M 3/33584* (2013.01); *H02M 1/0009* (2021.05); *H02M 3/01* (2021.05); *H02M 3/33573* (2021.05)

(58) Field of Classification Search
  CPC ............ H02M 3/01; H02M 3/22; H02M 3/24; H02M 3/335; H02M 3/33523;
  (Continued)

(56) References Cited

U.S. PATENT DOCUMENTS

2007/0070655 A1   3/2007  Eguchi et al.
2011/0317452 A1* 12/2011  Anguelov ......... H02M 3/33592
                                                    363/21.02
(Continued)

FOREIGN PATENT DOCUMENTS

CN    104158405 A      11/2014
CN    104796028 A  *   7/2015   ........ H02M 3/33507
(Continued)

OTHER PUBLICATIONS

First Office Action for Japanese Application No. 2022-027992, mailed Apr. 6, 2023.
(Continued)

*Primary Examiner* — Thienvu V Tran
*Assistant Examiner* — Shahzeb K Ahmad
(74) *Attorney, Agent, or Firm* — Wolf, Greenfield & Sacks, P.C.

(57)     ABSTRACT

An isolated bidirectional converter and a method for controlling the same are provided. A primary winding or a secondary winding of a transformer module in the isolated bidirectional converter is connected in parallel with a first branch includes a first inductor and a first current sensor that are connected in series. A current flowing through the first inductor is acquired by the first current sensor, and is proportional to a current flowing through a magnetizing inductor of the winding. Therefore, the current is controlled by modifying a duty cycle of a switch transistor on a bridge arm in the circuit, so that a direct current component of a current flowing through the winding is modified indirectly, thereby avoiding magnetic bias on the magnetizing inductor of the transformer module, and preventing the transformer module from being saturated.

15 Claims, 7 Drawing Sheets

(58) Field of Classification Search
CPC ......... H02M 3/33571; H02M 3/33573; H02M 3/33576; H02M 3/33584; H02M 3/33592; H02M 1/0003; H02M 1/0009; H02M 7/757; H02M 7/7575; H02M 7/758; H02M 7/77; H02M 7/79; H02M 7/797; H02M 7/81; H01F 27/40; H01F 2038/006
See application file for complete search history.

(56) References Cited

U.S. PATENT DOCUMENTS

| | | | | |
|---|---|---|---|---|
| 2015/0365005 | A1* | 12/2015 | Panov | H02M 3/33584 307/24 |
| 2016/0079873 | A1* | 3/2016 | Inoue | H02M 3/33584 363/21.04 |
| 2017/0054379 | A1* | 2/2017 | Nishikawa | H02M 3/015 |
| 2017/0155327 | A1 | 6/2017 | Tokumasu et al. | |
| 2017/0324343 | A1 | 11/2017 | Ishigaki et al. | |
| 2019/0115842 | A1 | 4/2019 | Chen | |
| 2019/0379292 | A1* | 12/2019 | Fei | H01F 3/14 |
| 2021/0366645 | A1* | 11/2021 | Lu | H01F 3/10 |
| 2022/0037988 | A1* | 2/2022 | Hauru | H02M 3/158 |
| 2023/0208304 | A1* | 6/2023 | Itogawa | H02M 1/44 363/13 |

FOREIGN PATENT DOCUMENTS

| | | |
|---|---|---|
| CN | 104796028 A | 7/2015 |
| CN | 105871215 A | 8/2016 |
| CN | 105981279 A | 9/2016 |
| CN | 106685229 A | 5/2017 |
| CN | 108880217 A | 11/2018 |
| CN | 109391155 A | 2/2019 |
| CN | 110289766 A | 9/2019 |
| EP | 3 118 983 A1 | 1/2017 |
| JP | 2005-176499 A | 6/2005 |
| JP | 2018-019526 A | 2/2018 |
| WO | WO 2020/194373 A1 | 10/2020 |

OTHER PUBLICATIONS

Extended European Search Report for European Application No. 22159656.2, dated Aug. 8, 2022.
Second Office Action for Chinese Application No. 202110713267.5, dated Jul. 22, 2022.
Rejection Decision for Chinese Application No. 202110713267.5, dated May 13, 2023.
Bao et al., Design and manufacture of high frequency circuit. University of Electronic Science and Technology Press. Apr. 30, 2012:96-101.

* cited by examiner

ISOLATED BIDIRECTIONAL CONVERTER AND METHOD FOR CONTROLLING THE SAME

The present disclosure claims priority to Chinese Patent Application No. 202110713267.5, titled "ISOLATED BIDIRECTIONAL CONVERTER AND METHOD FOR CONTROLLING THE SAME", filed on Jun. 25, 2021 with the China National Intellectual Property Administration, which is incorporated herein by reference in its entirety.

TECHNICAL FIELD

The present disclosure relates to the technical field of power electronics, and in particular to an isolated bidirectional converter and a method for controlling the isolated bidirectional converter.

BACKGROUND

With the development of new energy applications, demands for bidirectional transmission of electric energy are increasing. Researches on isolated bidirectional converters, as one of core technologies, are increasing. Generally, isolated bidirectional converters with various topologies each include a blocking capacitor to avoid a direct current component, thereby avoiding magnetic bias and magnetic saturation. For an isolated bidirectional converter with some topologies includes no blocking capacitor, there is a risk of magnetic bias and magnetic saturation when a high-frequency transformer in the isolated bidirectional converter operates. The magnetic bias has a relatively unfavorable effect on operation of the circuit, for example, affecting function of the soft switching, resulting in an increase in power loss. The magnetic saturation may directly result in system failure.

In various existing solutions to the above problems, a device is connected in series in a power loop, so as to reduce the direct current component. For example, a current sensor is connected in series in the power loop to perform sampling, so as to control a direct current component of a current flowing through the power loop by controlling the current, thereby avoiding magnetic bias. Alternatively, a blocking capacitor is connected in series in the power loop to avoid the direct current component in the current, thereby avoiding magnetic bias.

However, in the above existing solutions in which a device is connected in series in the power loop, a current flowing through the power loop is relatively large, the device connected in series inevitably results in additional loss, as well as an increase in size, weight and cost, which is therefore not conducive to application.

SUMMARY

In view of this, an isolated bidirectional converter and a method for controlling the isolated bidirectional converter are provided according to the present disclosure, to decrease power loss, size, weight and cost.

To solve the above problems, the following technical solutions are provided according to the present disclosure.

An isolated bidirectional converter is provided according to a first aspect of the present disclosure. The isolated bidirectional converter includes a transformer module, a primary circuit, and a secondary circuit. A direct current end of the primary circuit is connected to a first end of the isolated bidirectional converter. An alternating current end of the primary circuit is connected to a primary winding of the transformer module. An alternating current end of the secondary circuit is connected to a secondary winding of the transformer module. A direct current end of the secondary side circuit is connected to a second end of the isolated bidirectional converter. A single-phase of the primary winding or a single-phase of the secondary winding is connected in parallel to a first branch. Alternatively, at least two phases of the primary winding or at least two phases of the secondary winding each are connected in parallel to a first branch. The first branch includes a first inductor and a first current sensor that are connected in series.

In a case that the primary circuit and the secondary circuit each are a single-phase circuit, the primary winding is connected in parallel to the first branch, or the secondary winding is connected in parallel to the first branch. In a case that the primary circuit and the secondary circuit each are a three-phase circuit, three phases of the primary winding or three phases of the secondary winding each are connected in parallel to the first branch, or two phases of the primary winding or two phases of the secondary winding each are connected in parallel to a first branch.

In an embodiment, the isolated bidirectional converter is an asymmetric isolated bidirectional converter. The first branch is arranged in one of the primary circuit and the secondary circuit, and the one of the primary circuit and the secondary circuit includes no blocking capacitor.

In an embodiment, a magnetizing inductor of a winding that is connected in parallel to the first branch serves as a first impedance matching inductor of the isolated bidirectional converter, and a ratio of inductance of the first inductor to inductance of the magnetizing inductor is greater than a preset threshold.

In an embodiment, inductance of a magnetizing inductor of a winding that is connected in parallel to the first branch is greater than inductance of the first inductor, and the first inductor serves as a first impedance matching inductor of the isolated bidirectional converter.

In an embodiment, a second branch is arranged in one of the primary circuit and the secondary circuit, where the one of the primary circuit and the secondary circuit includes a blocking capacitor. The second branch includes a second inductor, and the second inductor serves as a second impedance matching inductor of the isolated bidirectional converter.

In the case that the primary circuit and the secondary circuit each are a single-phase circuit, the second branch is connected between midpoints of two bridge arms in the one of the primary circuit and the secondary circuit. In the case that the primary circuit and the secondary circuit each are a three-phase circuit, a midpoint of each bridge arm in the one of the primary circuit and the secondary circuit is connected to a second branch, to form a star topology.

In an embodiment, the second branch further includes at least one of a second current sensor connected in series to the second inductor and/or a controllable switch connected in series to the second inductor.

In an embodiment, the isolated bidirectional converter has a resonant topology.

A method for controlling the isolated bidirectional converter is provided according to a second aspect of the present disclosure. The method includes: determining, based on a current acquired by a first current sensor in the isolated bidirectional converter, whether a direct current component of a current flowing through a first inductor in the isolated bidirectional converter is greater than a first threshold; and modifying a duty cycle of a switch transistor on a bridge arm in a circuit in the isolated bidirectional converter to reduce the direct current component to below a second threshold, when it is determined that the direct current component is greater than the first threshold.

In an embodiment, before the determining, based on a current acquired by a first current sensor in the isolated bidirectional converter, whether a direct current component of a current flowing through a first inductor in the isolated bidirectional converter is greater than a first threshold, the method further includes: determining whether a circuit connected to a first branch in the isolated bidirectional converter serves as an input side, wherein when it is determined that the circuit connected to the first branch in the isolated bidirectional converter serves as an input side, whether the direct current component in the current flowing through the first inductor in the isolated bidirectional converter is greater than the first threshold is determined based on the current acquired by the first current sensor in the isolated bidirectional converter.

In an embodiment, the first threshold is greater than or equal to the second threshold.

In the isolated bidirectional converter according to the present disclosure, a single-phase of the primary winding or the secondary winding of the transformer module is connected in parallel with a first branch. Alternatively, at least two phases of the primary winding or the secondary winding of the transformer module each are connected in parallel with the first branch. The first branch includes a first inductor and a first current sensor that are connected in series. A current flowing through the first inductor is acquired by the first current sensor, and is proportional to a current flowing through a magnetizing inductor of the winding. Therefore, the current is controlled by modifying a duty cycle of a switch transistor on a bridge arm in the circuit, so that a direct current component of a current flowing through the winding is modified indirectly, thereby avoiding magnetic bias on the magnetizing inductor of the transformer module, and preventing the transformer module from being saturated. In addition, the current flowing through the first branch does not include a component of a load current. Therefore, the current is greatly smaller compared with a load current flowing through the device connected in series in the power loop in the existing solutions, thereby reducing the loss greatly. Further, the first inductor is designed based on requirements such as sampling accuracy and inductor loss, thereby reducing size, weight, cost, and loss of the inductor.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely some embodiments of the present disclosure, and those skilled in the art may obtain other drawings according to the provided drawings without any creative effort.

DETAILED DESCRIPTION OF EMBODIMENTS

Technical solutions according to embodiments of the present disclosure are clearly and completely described below in conjunction with the drawings in the embodiments of the present disclosure. Apparently, the embodiments described below are only some rather than all the embodiments of the present disclosure. All other embodiments obtained by those skilled in the art based on the embodiments in the present disclosure without any creative effort fall within the protection scope of the present disclosure.

In the present disclosure, the term "include", "comprise" or any variant thereof is intended to be nonexclusive, so that a process, method, article or device including a series of elements includes not only those elements but also other elements not listed or an element(s) inherent in the process, method, article or device. An expression "including (comprising) . . . " in which an element is defined do not preclude presence of an additional identical element(s) in the process, method, article or device comprising the listed element(s) unless further defined.

At present, among isolated bidirectional converters with various topologies, there are more researches on topologies such as a dual active bridge DAB, and resonant topologies including LLC, CLLC and L-LLC. These topologies have their advantages and disadvantages and have a certain scope of application. However, when a high-frequency transformer in a circuit including no blocking capacitor operates, there is a risk of magnetic bias and magnetic saturation. An LLC circuit is taken as an example for description below.

Figure 1:
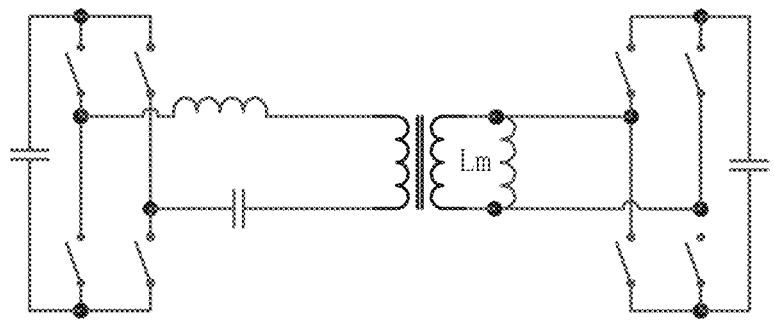
FIG. 1 is a schematic structural diagram showing an existing isolated bidirectional converter.

FIG. 1 shows an existing isolated bidirectional converter with a single-phase LLC circuit structure, in which a magnetizing inductor Lm in a transformer is shown. When the converter operates in a forward direction, a resonant capacitor doubles as a blocking capacitor Therefore, there is no magnetic bias on the magnetizing inductor Lm in the transformer. However, when the converter operates in a reverse direction, there is a risk of magnetic bias and magnetic saturation because the magnetizing inductor Lm is connected between midpoints of two bridge arms on the right.

Figure 2:
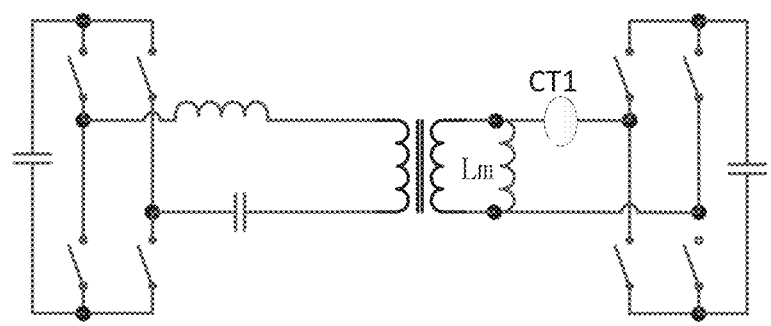
FIGS. 2 and 3 each are a schematic structural diagram showing a structure of an existing isolated bidirectional converter capable of avoiding magnetic bias and magnetic saturation.

FIG. 2 is a schematic structural diagram showing an existing isolated bidirectional converter for reducing the risk of magnetic bias and magnetic saturation when the isolated bidirectional converter operates in the reverse direction as shown in FIG. 1. In the isolated bidirectional converter shown in FIG. 2, a current sensor CT1 is arranged in a reverse loop to sample a current when the converter operates in reverse, so as to control a duty cycle of a switch transistor in a bridge arm on the right, thereby avoiding magnetic bias. However, the current sensor CT1 is connected in series in a power loop, which has problems of large loss, large size, large weight and high cost.

Figure 3:
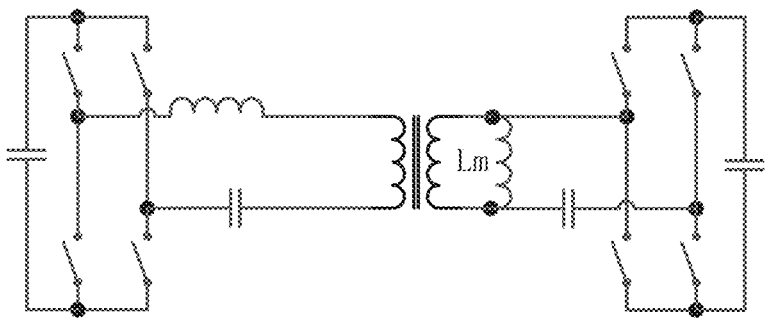

FIG. 3 is a schematic structural diagram showing an existing isolated bidirectional converter for reducing the risk of magnetic bias and magnetic saturation as shown in FIG. 1. A blocking capacitor is arranged in a reverse loop to avoid magnetic bias as shown in FIG. 3. Since the blocking capacitor is connected in series in the power loop, the problems of large loss, large size, large weight and high cost still exist.

Therefore, an isolated bidirectional converter is provided according to the present disclosure, to decrease power loss, size, weight and cost.

Referring to FIGS. 4a to 5b, the isolated bidirectional converter includes: a transformer module (represented by T in FIGS. 4a and 4b, and Ta, Tb, and Tc in each of FIGS. 5a and 5b), a primary circuit 101 and a secondary circuit 102.

A direct current end of the primary circuit 101 is connected to a first end of the isolated bidirectional converter. An alternating current end of the primary circuit 101 is connected to a primary winding of the transformer module.

An alternating current end of the secondary circuit 102 is connected to a secondary winding of the transformer module. A direct current end of the secondary circuit 102 is connected to a second end of the isolated bidirectional converter.

When the isolated bidirectional converter operates in a forward direction, the first end functions as an input end, and the second end functions as an output end. In this case, since a resonant capacitor doubles as a blocking capacitor, there is no magnetic bias on the magnetizing inductor Lm in the transformer module.

Figure 4A:
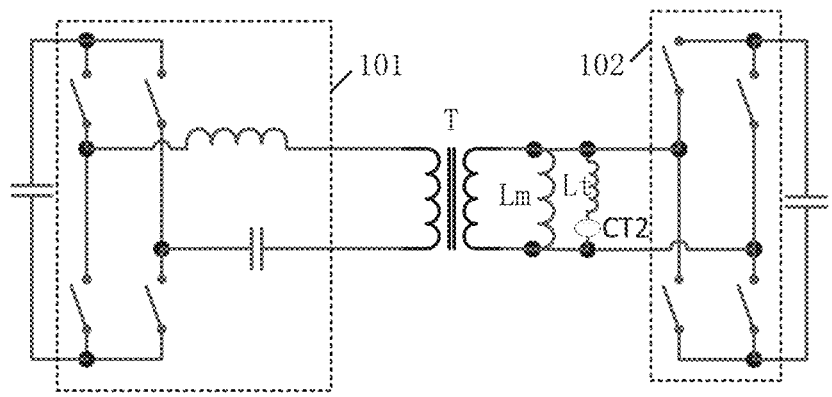
FIGS. 4a, 4b, 5a, 5b, 6 and 7 each are a schematic structural diagram showing a structure of an isolated bidirectional converter according to an embodiment of the present disclosure.
Figure 4B:
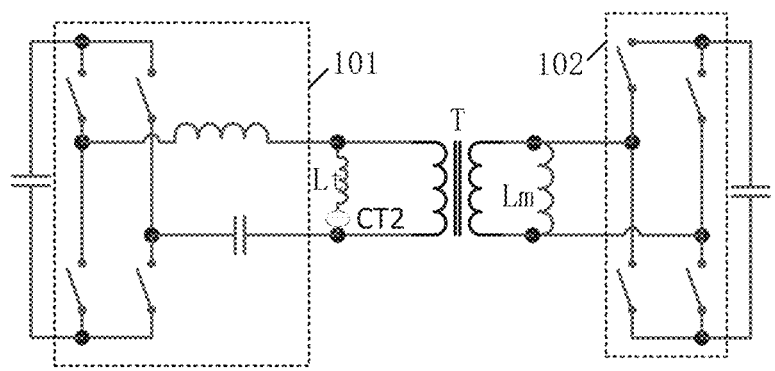
Figure 5A:
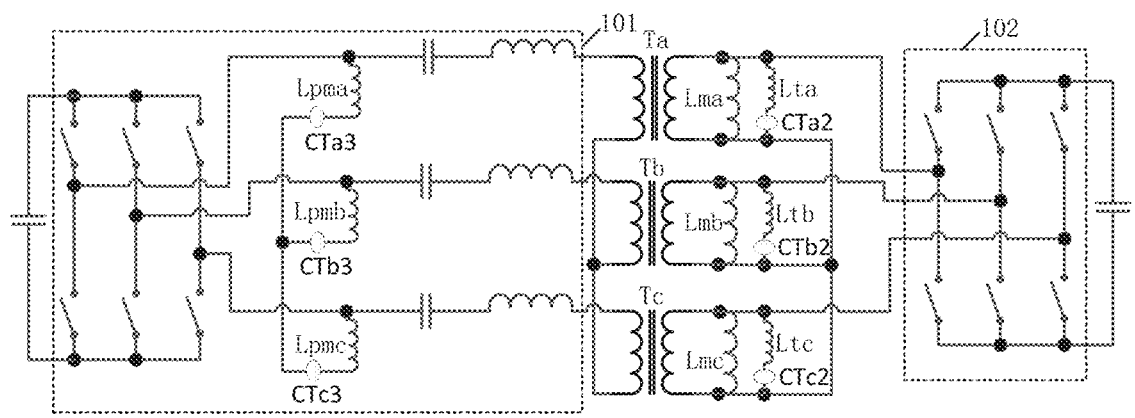
Figure 5B:
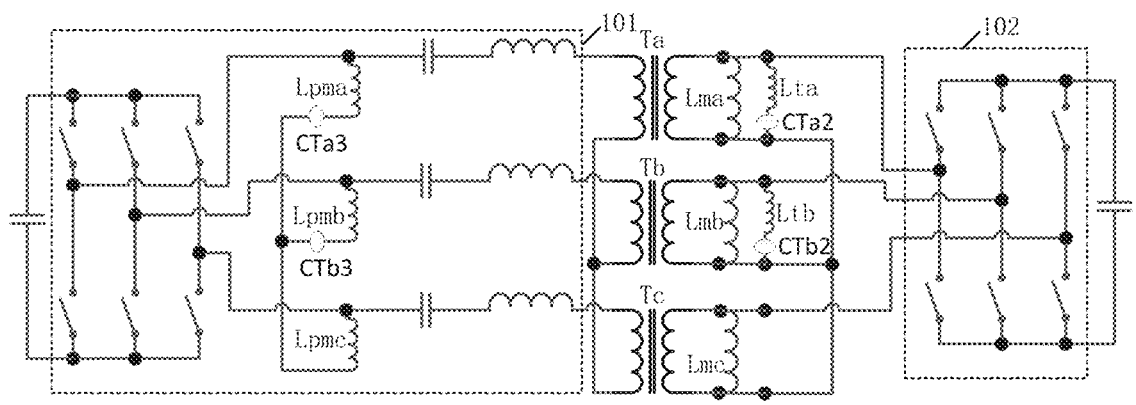

When the isolated bidirectional converter operates in a reverse direction, the second end functions as an input end and the first end functions as an output end. In this case, a single-phase or at least two phases of the primary winding in the transformer module is connected in parallel with a first branch (as shown in FIG. 4b). Alternatively, a single-phase or at least two phases of the secondary winding in the transformer module is connected in parallel with a first branch (as shown in FIGS. 4a, 5a, and 5b). The first branch includes a first inductor and a first current sensor that are connected in series.

As shown in FIGS. 4a and 4b, the transformer module includes a single-phase transformer T. The primary circuit 101 and the secondary circuit 102 are each a single-phase circuit. The primary winding is connected in parallel with the first branch (as shown in FIG. 4b). Alternatively, the secondary winding is connected in parallel with the first branch (as shown in FIG. 4a). Whether the primary winding or the secondary winding is connected in parallel with the first branch depends on application scenarios. As shown in FIGS. 4a and 4b, the first branch includes a first inductor Lt and a first current sensor CT2 that are connected in series.

As shown in FIGS. 5a and 5b, the isolated bidirectional converter is a three-phase converter. The transformer module includes three transformers Ta, Tb, and Tc (as shown in FIGS. 5a and 5b), Alternatively, the transformer module as shown in FIGS. 5a and 5b includes multiple transformers connected in series or parallel. For example, the transformer module includes six transformers, each two of which are connected in series or parallel. Alternatively, the transformer module a three-phase transformer module. A structure of the transformer module depends on application scenarios, and is not limited herein. In this case, the primary circuit 101 and the secondary circuit 102 each are a three-phase circuit. Three phases of the primary winding or three phases of the secondary winding each are connected in parallel with a first branch (as shown in FIG. 5a). Referring to FIG. 5a, a first branch connected in parallel with the a-phase includes a first inductor Lta and a first current sensor CTa2 that are connected in series. A first branch connected in parallel with the b-phase includes a first inductor Ltb and a first current sensor CTb2 that are connected in series. A first branch connected in parallel with the c-phase includes a first inductor Ltc and a first current sensor CTc2 that are connected in series. Alternatively, two phases of the primary winding or the secondary winding each are connected in parallel with a first branch (as shown in FIG. 5b), Referring to FIG. 5b, a first branch connected in parallel with the a-phase includes a first inductor Lta and a first current sensor CTa2 that are connected in series. A first branch connected in parallel with the b-phase includes a first inductor Ltb and a first current sensor CTb2 that are connected in series. In this case, a current of a third phase is calculated based on currents of other two phases. Therefore, currents of two phases are sampled directly, and the current of the third phase is obtained by calculation, so as to perform control.

As shown in FIG. 4a, a first inductor Lt is connected in parallel to a winding of the transformer T, and a current passing through the first inductor Lt is detected by a first current sensor CT2. When the isolated bidirectional converter operates in a reverse direction, a direct current component in the current passing through the first inductor Lt is reduced by controlling a duty cycle of a switch transistor in a bridge arm (that is, a bridge arm in FIG. 4a on the right) in the secondary circuit 102. Since the first inductor Lt is connected in parallel with the magnetizing inductor Lm, a current flowing through the magnetizing inductor Lm is proportional to the current flowing through the first inductor Lt. Therefore, the magnetic bias on the magnetizing inductor Lm in the transformer T is avoided by reducing the direct current component in the current flowing through the first inductor Lt.

In FIG. 4a, since the first inductor Lt is connected between midpoints of the bridge arm on the right, no load current flows through the first inductor Lt. Therefore, problems of large loss, large size, large weight and high cost due to a device connected in series in a power loop as shown in FIGS. 2 and 3 are solved.

In the embodiment shown in FIG. 4a, the first branch is connected between midpoints of two bridge arms of the secondary circuit 102, so that magnetic bias on the magnetizing inductor in the transformer T is avoided and the transformer T is prevented from saturation as described above. Alternatively, the first branch is connected in parallel with the primary winding, as shown in FIG. 4b. In this case, a load current on one end of the transformer is proportional to a load current on the other end of the transformer. A direct current component of a current passing through the first inductor Lt is reduced by controlling a duty cycle of a switch transistor in a bridge arm (that is, a bridge arm in FIG. 4b on the right) in the secondary circuit 102 based on a current acquired by the first current sensor CTa2.

With the isolated bidirectional converter according to the embodiments, a current passing through the first inductor is obtained by the first current sensor, and is proportional to a current passing through a magnetizing inductor of a winding. Therefore, a duty cycle of a switch transistor in a bridge arm in the circuit is modified to control the current, so that a direct current component of a current passing through the winding is controlled indirectly, thereby avoiding magnetic bias on the magnetizing inductor in the transformer module, and preventing the transformer module from being saturated. In addition, the current passing through the first branch do not include a component of a load current. Therefore, the current is greatly smaller compared with a load current flowing through the device connected in series in the power loop in the existing solutions, thereby reducing the loss greatly. Further, the first inductor is designed based on requirements such as sampling accuracy and inductor loss, thereby reducing size, weight, cost, and loss of the inductor.

It should be noted that there are some existing solutions in which the above direct current component is reduced based on impedance of a circuit and conductive resistance of a switch transistor or the like so as to avoid magnetic bias and magnetic saturation. However, these solutions cannot effectively work when the direct current component is large and changes dynamically, having a risk of failure.

With the isolated bidirectional converter according to embodiments of the present disclosure, magnetic bias and magnetic saturation can be effectively avoided as described above. Further, magnetic bias and magnetic saturation can be effectively avoided even when the direct current component changes dynamically.

In practice, isolated bidirectional converters are divided into symmetrical isolated bidirectional converters and asymmetrical isolated bidirectional converters. A primary circuit 101 and a secondary circuit 102 of a symmetrical isolated bidirectional converter each include a blocking capacitor, or each include no blocking capacitor. A symmetrical isolation bidirectional converter whose primary circuit and secondary circuit each including a blocking capacitor do not have the above-mentioned problems of magnetic bias and magnetic saturation. A symmetrical isolation bidirectional converter whose primary circuit and secondary circuit each including no blocking capacitor is already provided with a current sensor connected in series in a power loop for control. Therefore, the above-mentioned first branch is arranged in this symmetrical isolation bidirectional converter. Alternatively, the current sensor connected in series in the power loop is used to avoid magnetic bias and magnetic saturation. The isolated bidirectional converter according to the embodiments is preferably an asymmetrical isolated bidirectional converter in a structure such as a dual active bridge (DAB), or resonant topologies including LLC, CLLC, L-LLC or the like.

Further, to avoid interference and errors in a process of transferring a ratio, the first branch is arranged in one of the primary circuit 101 and the secondary circuit 102. The one of the primary circuit 101 and the secondary circuit 102 includes no blocking capacitor (as shown in FIG. 4a, FIG. 5a and FIG. 5b).

The embodiment shown in FIG. 4a is taken as an example for description. A first inductor Lt is connected in parallel to the magnetizing inductor Lm in the transformer T. Since a current flowing through the first inductor Lt is proportional to a current flowing through the magnetizing inductor Lm of the transformer T, the current flowing through the magnetizing inductor Lm in the transformer T is indirectly controlled by controlling the current flowing through the first inductor Lt, thereby avoiding magnetic bias on the magnetizing inductor Lm in the transformer T and preventing the transformer T from being saturated.

In practice, when the magnetizing inductor Lm serves as a first impedance matching inductor of the isolated bidirectional converter, inductance of the first inductor Lt approximating to inductance of the magnetizing inductor Lm significantly affects an original power loop, and the inductance of the first inductor much larger than the inductance of the magnetizing inductor Lm slightly affects the original power loop. In practice, a ratio of inductance of the first inductor Lt to inductance of the magnetizing inductor Lm is set to be greater than a preset threshold.

A size of the first inductor Lt is calculated based on AP method, which is described as follows.

$$AP = Ae \times Aw;$$

$$Ae = \frac{L \times I}{N \times B} = \frac{1}{N \times B} \times \frac{V}{4 \times f} = \frac{V}{4 \times f \times N \times B};$$

$$Aw = N \times \frac{\alpha \times I}{J} = N \times \frac{\alpha}{J} \times \frac{V}{4 \times f \times L};$$

$$AP = \frac{V}{4 \times f \times N \times B} \times N \times \frac{\alpha}{J} \times \frac{V}{4 \times f \times L} = \frac{\alpha \times V^2}{16 \times L \times f^2 \times B \times J};$$

where Ae represents a cross-sectional area of a magnetic core, L represents inductance, N represents the number of turns of a inductor, B represents magnetic induction intensity in an iron core, V represents a voltage across a inductor, f represents an operating frequency of a inductor, Aw represents a winding window area of the iron core, α represents a packing factor of wiring, I represents an inductor current, and J represents density of the inductor current.

It can be seen from the above calculation that an AP value, which is closely related to the size of the inductor, is inversely proportional to the inductance. That is, the size of the inductor is inversely proportional to the inductance. Therefore, the size of the first inductor Lt is reduced by increasing the inductance of the first inductor Lt while application requirements are satisfied.

In some application scenarios, inductance of the magnetizing inductor Lm is increased due to the first inductor Lt. That is, the inductance of the magnetizing inductor Lm is larger than the inductance of the first inductor Lt. The first inductor Lt functions as the first impedance matching inductor of the isolated bidirectional converter, to implement impedance matching that is originally implemented by the magnetizing inductor Lm. That is, in some application scenarios, the first inductor Lt doubles as the impedance matching inductor required by the circuit, thereby further reducing a size and cost of the system.

Based on the above embodiments, a second branch is arranged in one of the primary circuit and the secondary circuit of the isolated bidirectional converter. The one of the primary circuit and the secondary circuit in which the second branch is arranged includes a blocking capacitor. The second branch includes a second inductor. The second inductor serves as a second impedance matching inductor of the isolated bidirectional converter. The inductance of the second impedance matching inductor is equal to or different from the inductance of the first impedance matching inductor, depending on specific application scenarios and which is not limited herein.

The single-phase LLC structure is taken as an example. A first inductor Lt is connected in parallel to a winding of the transformer T and a current flowing through the first inductor is detected. By controlling a duty cycle of a switch transistor in a bridge arm on the right, the above-mentioned magnetic bias and magnetic saturation can be avoided.

Figure 6:
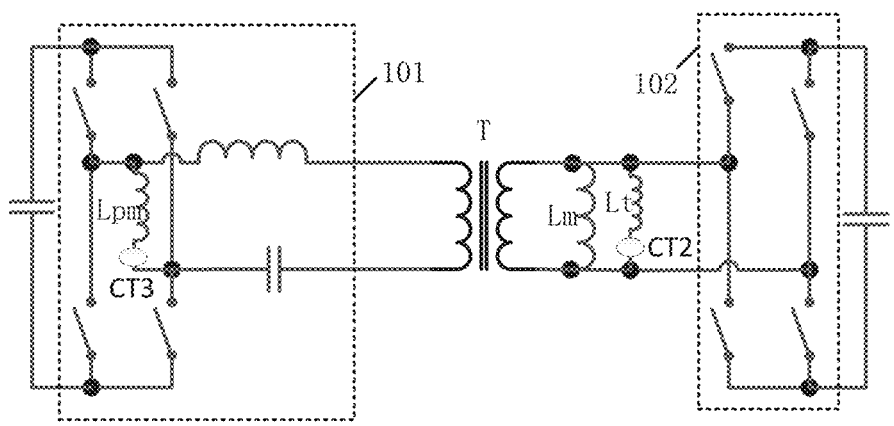

Based on the embodiment shown in FIG. 4a, a second inductor Lpt is connected between midpoints of two bridge arms (that is, the bridge arms on the left shown in the drawings) in the primary circuit 101 including a blocking capacitor, to from a circuit as shown in FIG. 6, so as to improve modifyment capability of the LLC circuit when operating in the reverse direction.

It should be noted that the second inductor Lpt has a risk of magnetic bias when operating in a forward direction. However, no load current passes through the second inductor Lpt, so that the current flowing through the second inductor is small and is directly sampled by the second current sensor CT3 connected in series with the second inductor Lpt, so as to perform control.

FIGS. 5a and 5b each show a three-phase converter including three second branches. The second branch connected to a-phase includes a second inductor Lpma and a second current sensor CTa3 that are connected in series. The second branch connected to b-phase includes a second inductance Lpmb and a second current sensor CTb3 that are connected in series. The second branch connected to c-phase includes a second inductance Lpmc and a second current sensor CTc3 that are connected in series.

Referring to FIG. 6, when the transformer module includes a single-phase transformer, the second branch is connected between midpoints of two bridge arms in the circuit. Referring to FIGS. 5a and 5b, when the primary side circuit 101 and the secondary side circuit 102 each are a three-phase circuit, midpoints of three bridge arms in the circuit including the second branch each are connected to a second branch, to form a star topology.

Figure 7:
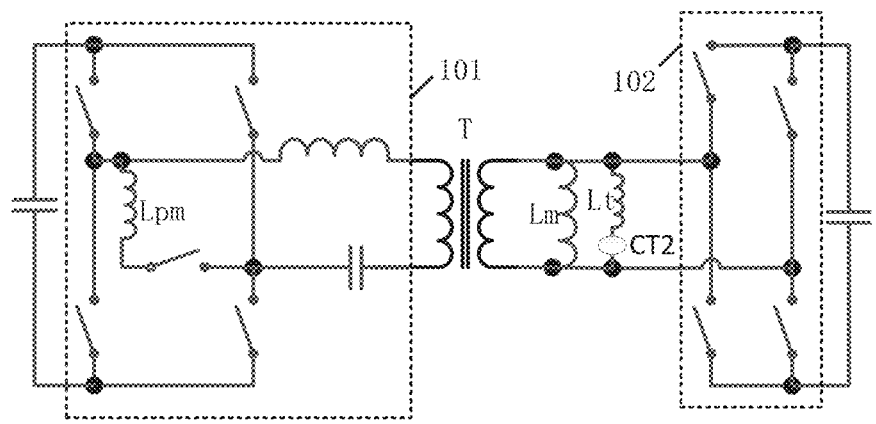

In practice, to further improve the performance of the circuit shown in FIG. 6, the second inductor Lpt connected between midpoints of two bridge arms in the primary circuit 101 is connected to a controllable switch instead of the second current sensor CT3, as shown in FIG. 7. When the isolation bidirectional converter operates in the forward direction, the controllable switch is open to cut off the second inductor Lpt from the circuit, thereby avoiding circulation current loss through the bridge arm on the left and the second inductor Lpt.

In this case, since the second inductor Lpt connected between midpoints of the bridge arm on the left does not work when the circuit operates in the forward direction, the second current sensor CT3 connected in series with the second inductor Lpt is removed (as shown in FIG. 7), In practice, the second inductor Lpt may further be connected to the second current sensor CT3 (not shown), all of the above solutions are within the scope of the present disclosure. The three-phase converter is similar to the circuit as shown in FIG. 7, and is not described in detail herein.

For other structures and topologies, reference is made to the above-mentioned embodiments, which are not described in detail herein.

A method for controlling an isolated bidirectional converter is further provided according to another embodiment of the present disclosure. The isolated bidirectional converter is the isolated bidirectional converter according to any one of the above embodiments of the present disclosure. That is, a first branch including a first inductor and a first current sensor that are connected in series is connected in parallel at a port of a winding of a high-frequency transformer module in the isolated bidirectional converter. For a structure of the isolated bidirectional converter, reference is made to the above-mentioned embodiments, which is not described in detail herein.

Figure 8:
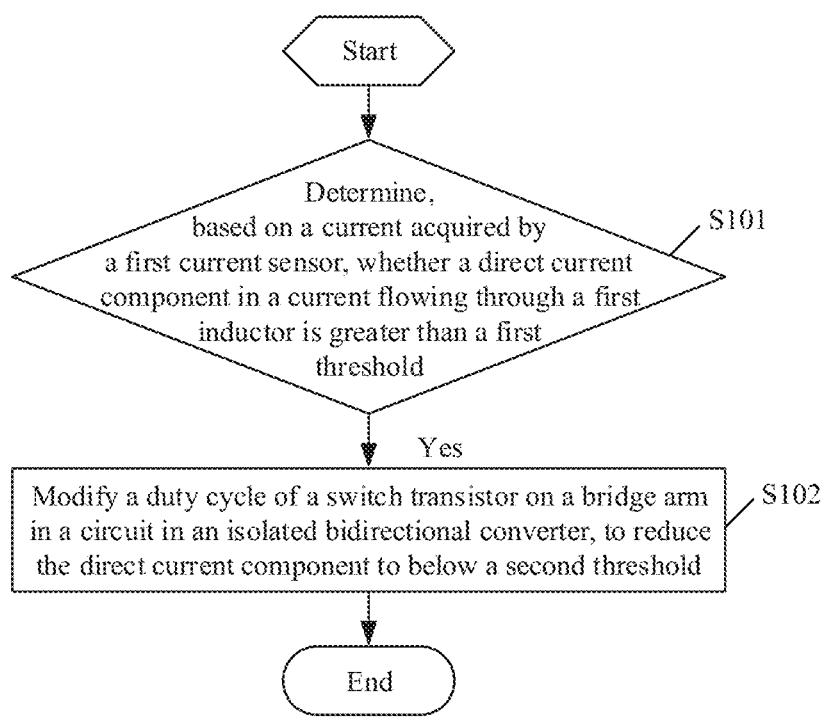
FIGS. 8 and 9 each are a flowchart showing a method for controlling an isolated bidirectional converter according to an embodiment of the present disclosure.

Referring to FIG. 8, the method includes the following steps S101 to S102.

In step S101, it is determined, based on a current acquired by a first current sensor in the isolated bidirectional converter, whether a direct current component of a current flowing through a first inductor in the isolated bidirectional converter is greater than a first threshold.

Step S102 is performed when the direct current component is determined as greater than the first threshold.

In step S102, a duty cycle of a switch transistor on a bridge arm in a circuit in the isolated bidirectional converter is modified, to reduce the direct current component to below a second threshold.

Based on the current acquired by the first current sensor, the direct current component in the current flowing through the first inductor is acquired, so that a direct current component of a current flowing through a magnetizing inductor in the transformer module is acquired indirectly. The direct current component in the current flowing through the magnetizing inductor in the transformer module is indirectly controlled by controlling the direct current component in the current flowing through the first inductor.

When an asymmetrical isolated bidirectional converter includes no blocking capacitor, the magnetic bias due to the direct current component is avoided based on the above solutions.

In the existing solutions, an additional device is connected in series in the power loop. In the technical solutions of the present disclosure, the first branch is connected in parallel to a main power loop, having advantages of small size, light weight, low loss, and low cost.

Figure 9:
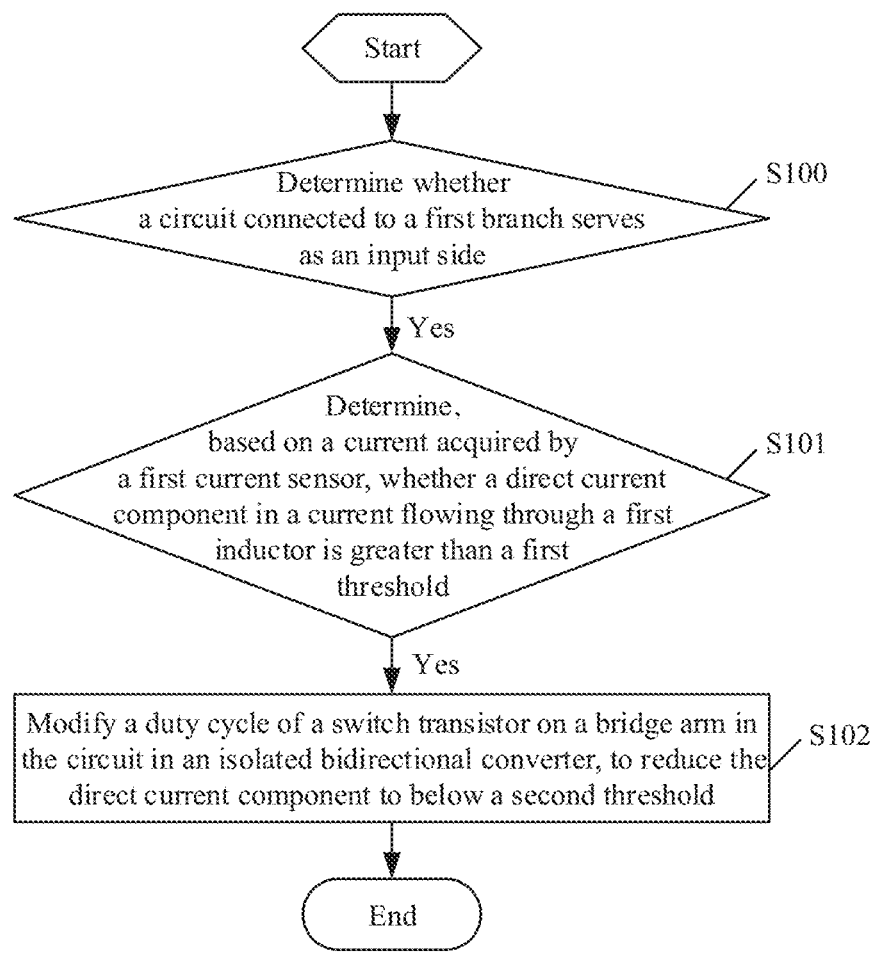

In practice, when a converter, for example, as shown in FIG. 4, operates in a forward direction, a resonant capacitor functions as a blocking capacitor. Therefore, no magnetic bias exists on the magnetizing inductor Lm in the transformer. When the converter operates in a reverse direction, there is a risk of magnetic bias and magnetic saturation since there is no blocking capacitor. The method further includes a step S100 before the step S101, as shown in FIG. 9.

In step S100, it is determined whether a circuit connected to the first branch in the isolated bidirectional converter serves as an input side.

For the circuit as shown in FIG. 4a, it is determined whether the secondary circuit 102 serves as an input side. For the circuit as shown in FIG. 4b, it is determined whether the primary circuit 101 serves as an input side.

If the circuit connected to the first branch in the isolated bidirectional converter is determined as serving as an input side, it is indicated that the isolated bidirectional converter operates in a reverse direction, and the step S101 is performed.

In practice, the first threshold is greater than or equal to the second threshold. When the first threshold is greater than the second threshold, hysteresis control is performed to avoid repeated modifying on the duty cycle.

The embodiments in this specification are described in a progressive manner. For the same or similar parts between the embodiments, one may refer to the description of other embodiments. Each embodiment lays emphasis on differences from other embodiments. Since the system or the system embodiment is similar to the method embodiment, the description for the system embodiment is relatively simple. For related parts, reference may be made to description in the method embodiment. The system and system embodiment described above are merely illustrative, and units described as separate components may or may not be physically separated. The components shown as units may be or not be physical units, that is, the units may be located at the same place or may be distributed onto multiple network units. All or a part of the modules may be selected based on actual needs to realize the objective of the solutions according to the embodiments. The solutions according to the embodiments can be understood and implemented by those skilled in the art without any creative work.

Those skilled in the art should further appreciate that the units and algorithm steps of each embodiment described in connection with the embodiments disclosed herein can be implemented in electronic hardware, computer software or a combination of both. In order to clearly illustrate the interchangeability between the hardware and software, the units and steps in each embodiment have been generally described in terms of functions in the above description. Whether these functions are performed in hardware or software depends on the specific applications and design constraints of the technical solution. Those skilled in the art may use other methods to implement the described functions for each particular application, such implementation should not be considered to be beyond the scope of the present disclosure.

Based on the above description of the disclosed embodiments, features described in the embodiments in this specification may be replaced or combined so that those skilled in the art are capable of carrying out or using the present disclosure. Those skilled in the art can easily make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. An isolated bidirectional converter, comprising: a three-phase transformer module, a primary circuit, and a secondary circuit, wherein
   a direct current end of the primary circuit is connected to a first end of the isolated bidirectional converter;
   an alternating current end of the primary circuit is connected to a primary winding of the transformer module;
   an alternating current end of the secondary circuit is connected to a secondary winding of the transformer module;
   a direct current end of the secondary circuit is connected to a second end of the isolated bidirectional converter; and
   at least two phases of the primary winding or at least two phases of the secondary winding each are connected in parallel to a first branch, wherein the first branch comprises a first inductor and a first current sensor that are connected in series.

2. The isolated bidirectional converter according to claim 1, wherein
   the primary circuit and the secondary circuit each are a three-phase circuit, three phases of the primary winding or three phases of the secondary winding each are connected in parallel to a first branch, or two phases of the primary winding or two phases of the secondary winding each are connected in parallel to a first branch.

3. The isolated bidirectional converter according to claim 2, wherein the isolated bidirectional converter is an asymmetric isolated bidirectional converter, the first branch is arranged in one of the primary circuit and the secondary circuit, and the one of the primary circuit and the secondary circuit comprises no blocking capacitor.

4. The isolated bidirectional converter according to claim 3, wherein a magnetizing inductor of a winding that is connected in parallel to the first branch serves as a first impedance matching inductor of the isolated bidirectional converter, and a ratio of inductance of the first inductor to inductance of the magnetizing inductor is greater than a preset threshold.

5. The isolated bidirectional converter according to claim 4, wherein the isolated bidirectional converter has a resonant topology.

6. The isolated bidirectional converter according to claim 3, wherein an inductance of a magnetizing inductor of a winding that is connected in parallel to the first branch is greater than an inductance of the first inductor, and the first inductor serves as a first impedance matching inductor of the isolated bidirectional converter.

7. The isolated bidirectional converter according to claim 6, wherein the isolated bidirectional converter has a resonant topology.

8. The isolated bidirectional converter according to claim 3, wherein the isolated bidirectional converter has a resonant topology.

9. The isolated bidirectional converter according to claim 2, wherein a second branch is arranged in one of the primary circuit and the secondary circuit, wherein the one of the primary circuit and the secondary circuit comprises a blocking capacitor, the second branch comprises a second inductor, and the second inductor serves as a second impedance matching inductor of the isolated bidirectional converter.

10. The isolated bidirectional converter according to claim 9, wherein
    a midpoint of each bridge arm in the one of the primary circuit and the secondary circuit is connected to a second branch, to form a star topology.

11. The isolated bidirectional converter according to claim 9, wherein the second branch further comprises at least one of:
    a second current sensor connected in series to the second inductor; and
    a controllable switch connected in series to the second inductor.

12. The isolated bidirectional converter according to claim 2, wherein the isolated bidirectional converter has a resonant topology.

13. A method for controlling an isolated bidirectional converter, wherein the isolated bidirectional converter comprises a transformer module, a primary circuit, and a secondary circuit, a direct current end of the primary circuit is connected to a first end of the isolated bidirectional converter, an alternating current end of the primary circuit is connected to a primary winding of the transformer module, an alternating current end of the secondary circuit is connected to a secondary winding of the transformer module, a direct current end of the secondary circuit is connected to a second end of the isolated bidirectional converter; and a single-phase of the primary winding or a single-phase of the secondary winding is connected in parallel to a first branch, or at least two phases of the primary winding or at least two phases of the secondary winding each are connected in parallel to a first branch, wherein a first branch comprises a first inductor and the first current sensor that are connected in series, and wherein the method comprises:
    determining whether a circuit connected to the first branch in the isolated bidirectional converter serves as an input side;
    determining, based on a current acquired by a first current sensor in the isolated bidirectional converter, whether a direct current component of a current flowing through the first inductor in the isolated bidirectional converter is greater than a first threshold, if it is determined that the circuit connected to the first branch in the isolated bidirectional converter serves as the input side; and
    modifying a duty cycle of a switch transistor on a bridge arm in a circuit in the isolated bidirectional converter to reduce the direct current component to below a second threshold, in a case that it is determined that the direct current component is greater than the first threshold.

14. The method for controlling an isolated bidirectional converter according to claim 13, wherein the first threshold is greater than or equal to the second threshold.

15. The method for controlling the isolated bidirectional converter according to claim 13, wherein the first threshold is greater than or equal to the second threshold.

\* \* \* \* \*